(12) United States Patent
Tobin et al.

(10) Patent No.: US 10,830,206 B2
(45) Date of Patent: Nov. 10, 2020

(54) METHODS FOR MANUFACTURING WIND TURBINE ROTOR BLADES AND COMPONENTS THEREOF

(71) Applicant: General Electric Company, Schenectady, NY (US)

(72) Inventors: James Robert Tobin, Simpsonville, SC (US); Stephen Bertram Johnson, Greenville, SC (US); Jamie T. Livingston, Simpsonville, SC (US); Shridhar Champaknath Nath, Niskayuna, NY (US); Alan M. Walker, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 737 days.

(21) Appl. No.: 15/424,084

(22) Filed: Feb. 3, 2017

(65) Prior Publication Data

US 2018/0223795 A1 Aug. 9, 2018

(51) Int. Cl.
*F03D 1/06* (2006.01)
*B33Y 10/00* (2015.01)
(Continued)

(52) U.S. Cl.
CPC ............ *F03D 1/0675* (2013.01); *B29C 64/10* (2017.08); *B33Y 10/00* (2014.12); *B33Y 80/00* (2014.12);
(Continued)

(58) Field of Classification Search
CPC .... F03D 1/0675; F03D 1/0683; F03D 1/0666; F03D 1/0691; F03D 1/065; F03D 1/00;
(Continued)

(56) References Cited

U.S. PATENT DOCUMENTS

| RE19,412 E | 1/1935 | Zaparka |
| 2,450,440 A | 10/1948 | Mills |

(Continued)

FOREIGN PATENT DOCUMENTS

| CN | 101906251 A | 12/2010 |
| CN | 103358564 A | 10/2013 |

(Continued)

OTHER PUBLICATIONS

PCT Search Report, dated Jan. 30, 2019.
(Continued)

*Primary Examiner* — Moshe Wilensky
*Assistant Examiner* — Jason Mikus
(74) *Attorney, Agent, or Firm* — Dority & Manning, P.A.

(57) ABSTRACT

The present disclosure is directed to methods for manufacturing wind turbine rotor blades and components thereof, e.g. using 3D printing. In one embodiment, the method includes forming a rotor blade structure having a first surface and an opposing, second surface, the first and second surfaces being substantially flat. Another step includes printing a leading edge segment of the rotor blade onto the first surface, wherein heat from the printing bonds the leading edge segment to the first surface. The method also includes rotating the rotor blade structure having the leading edge segment attached thereto. A further step includes printing a trailing edge segment of the rotor blade onto the second surface, wherein heat from the printing bonds the trailing edge segment to the second surface. Another step includes securing one or more fiber-reinforced outer skins to the leading and trailing edge segments so as to complete the rotor blade.

14 Claims, 13 Drawing Sheets

(51) Int. Cl.
*B33Y 80/00* (2015.01)
*B29C 64/10* (2017.01)
*B29L 31/08* (2006.01)

(52) U.S. Cl.
CPC ... *B29L 2031/085* (2013.01); *F05B 2230/103* (2013.01); *F05B 2230/232* (2013.01); *F05B 2230/31* (2013.01); *F05B 2230/60* (2013.01); *F05B 2280/4007* (2013.01); *F05B 2280/6003* (2013.01); *F05B 2280/6013* (2013.01); *Y02E 10/721* (2013.01); *Y02P 70/523* (2015.11)

(58) Field of Classification Search
CPC .. F03D 1/06; B23P 6/007; B23P 15/00; B23P 15/02; B23P 15/04; F05D 2230/30
USPC ........................................................ 416/226
See application file for complete search history.

(56) References Cited

U.S. PATENT DOCUMENTS

| | | | |
|---|---|---|---|
| 2,451,131 | A | 10/1948 | Vidal |
| 2,503,450 | A * | 4/1950 | Nebesar ............... B64C 3/00 244/123.7 |
| 3,000,446 | A | 9/1961 | Warnken |
| 3,093,219 | A | 6/1963 | Ramme |
| 3,137,887 | A | 6/1964 | Mannino et al. |
| 3,321,019 | A | 5/1967 | Dmitroff et al. |
| 3,528,753 | A | 9/1970 | Dutton et al. |
| 3,586,460 | A | 6/1971 | Toner |
| 3,956,564 | A | 5/1976 | Hillig |
| 4,319,872 | A | 3/1982 | Lupke |
| 4,329,119 | A | 5/1982 | Baskin |
| 4,474,536 | A | 10/1984 | Gougeon et al. |
| 4,626,172 | A | 12/1986 | Mouille et al. |
| 4,718,844 | A | 1/1988 | Dickhut |
| 5,059,109 | A | 10/1991 | Dickhut |
| 5,088,665 | A | 2/1992 | Vijgen et al. |
| 5,346,367 | A | 9/1994 | Doolin et al. |
| 6,264,877 | B1 | 7/2001 | Pallu De La Barriere |
| 6,890,152 | B1 | 5/2005 | Thisted |
| 7,059,833 | B2 | 6/2006 | Stiesdal et al. |
| 7,364,407 | B2 | 4/2008 | Grabau |
| 7,458,777 | B2 | 12/2008 | Herr |
| 7,637,721 | B2 | 12/2009 | Driver et al. |
| 7,976,275 | B2 | 7/2011 | Miebach et al. |
| 7,988,421 | B2 | 8/2011 | Bakhuis et al. |
| 8,007,624 | B2 | 8/2011 | Stiesdal |
| 8,062,728 | B2 | 11/2011 | De Beats |
| 8,083,488 | B2 | 12/2011 | Fritz |
| 8,092,187 | B2 | 1/2012 | Bell |
| 8,162,590 | B2 | 4/2012 | Haag |
| 8,273,806 | B2 | 9/2012 | Guadagno et al. |
| 8,317,479 | B2 | 11/2012 | Vronsky et al. |
| 8,376,450 | B1 | 2/2013 | Long et al. |
| 8,540,491 | B2 | 9/2013 | Gruhn |
| 8,602,761 | B2 | 12/2013 | Arrizabalaga |
| 8,657,581 | B2 | 2/2014 | Pilpel et al. |
| 8,673,106 | B1 | 3/2014 | Jolley et al. |
| 8,678,746 | B2 | 3/2014 | Haag |
| 8,708,691 | B2 | 4/2014 | Matsen et al. |
| 8,747,098 | B1 | 6/2014 | Johnson et al. |
| 8,865,798 | B2 | 10/2014 | Merle et al. |
| 8,877,116 | B2 | 11/2014 | Grabau |
| 8,932,024 | B2 | 1/2015 | Hayashi et al. |
| 8,961,142 | B2 | 2/2015 | Wansink |
| 8,992,813 | B2 | 3/2015 | Robbins et al. |
| 9,090,027 | B2 | 7/2015 | Sutton |
| 9,150,721 | B2 | 10/2015 | Bateman et al. |
| 9,377,005 | B2 | 6/2016 | Yarbrough et al. |
| 9,434,142 | B2 | 9/2016 | Levit |
| 9,458,821 | B2 | 10/2016 | Jacobsen et al. |
| 9,512,818 | B2 | 12/2016 | Richtman |
| 9,719,489 | B2 | 8/2017 | Stewart |
| 10,273,935 | B2 | 4/2019 | Albert |

| | | | |
|---|---|---|---|
| 2004/0253114 | A1 | 12/2004 | Gunneskov et al. |
| 2007/0065290 | A1 | 3/2007 | Herr |
| 2007/0077150 | A1 | 4/2007 | Llorente Gonzalez |
| 2007/0107189 | A1 | 5/2007 | Prichard |
| 2009/0068017 | A1 | 3/2009 | Rudling |
| 2009/0074585 | A1 | 3/2009 | Koegler et al. |
| 2009/0140527 | A1 | 6/2009 | Pawar |
| 2009/0148300 | A1 | 6/2009 | Driver et al. |
| 2009/0155084 | A1 | 6/2009 | Livingston et al. |
| 2009/0301648 | A1 | 12/2009 | Hogg |
| 2010/0047070 | A1 | 2/2010 | Slot |
| 2010/0121475 | A1 | 5/2010 | Lyons |
| 2010/0135806 | A1 | 6/2010 | Benito |
| 2010/0135815 | A1 | 6/2010 | Bagepalli |
| 2010/0296940 | A1 | 11/2010 | Zuteck |
| 2010/0296941 | A1 | 11/2010 | Zuteck |
| 2011/0018282 | A1 | 1/2011 | Hayashi et al. |
| 2011/0076149 | A1 | 3/2011 | Santiago et al. |
| 2011/0097211 | A1 | 4/2011 | Rudling |
| 2011/0097326 | A1 | 4/2011 | Luehrsen |
| 2011/0100540 | A1 | 5/2011 | Mathew |
| 2011/0103965 | A1 | 5/2011 | Matthew |
| 2011/0135467 | A1 | 6/2011 | Saddoughi et al. |
| 2011/0142635 | A1 | 6/2011 | Frizt |
| 2011/0142667 | A1 | 6/2011 | Miebach et al. |
| 2011/0142668 | A1 | 6/2011 | Rao |
| 2011/0142670 | A1 | 6/2011 | Pilpel |
| 2011/0176928 | A1 | 7/2011 | Jensen |
| 2011/0200444 | A1 | 8/2011 | Garcia |
| 2011/0223028 | A1 | 9/2011 | Stege et al. |
| 2011/0243736 | A1 | 10/2011 | Bell |
| 2011/0243750 | A1 | 10/2011 | Gruhn |
| 2011/0266721 | A1 | 11/2011 | Song et al. |
| 2011/0268558 | A1 | 11/2011 | Driver |
| 2011/0286853 | A1 | 11/2011 | Kristensen |
| 2012/0009069 | A1 | 1/2012 | Grove-Nielsen |
| 2012/0027590 | A1 | 2/2012 | Bonnet |
| 2012/0027610 | A1 | 2/2012 | Yarbrough |
| 2012/0027612 | A1 | 2/2012 | Yarbrough |
| 2012/0027613 | A1 | 2/2012 | Yarbrough |
| 2012/0121430 | A1 | 5/2012 | Olsen et al. |
| 2012/0128810 | A1 | 5/2012 | Arriola Arizabalaga et al. |
| 2012/0134848 | A1 | 5/2012 | Ramirez Jimenez et al. |
| 2012/0138218 | A1 | 6/2012 | Dean et al. |
| 2012/0183408 | A1 | 7/2012 | Noerlem |
| 2012/0186730 | A1 | 7/2012 | Shindo |
| 2012/0263913 | A1 | 10/2012 | Karem |
| 2013/0108455 | A1 | 5/2013 | Quiring et al. |
| 2013/0164133 | A1 | 6/2013 | Grove-Nielsen |
| 2013/0186558 | A1 | 7/2013 | Comb |
| 2013/0241117 | A1 | 9/2013 | Lind |
| 2014/0072715 | A1 | 3/2014 | Jones et al. |
| 2014/0178204 | A1 | 6/2014 | Livingston et al. |
| 2014/0186175 | A1 | 7/2014 | Bachmann et al. |
| 2014/0205454 | A1 | 7/2014 | Giovannetti et al. |
| 2014/0295187 | A1 | 10/2014 | Jacobsen |
| 2014/0322023 | A1 | 10/2014 | Tapia |
| 2014/0328692 | A1 | 11/2014 | Riddell et al. |
| 2014/0334930 | A1 | 11/2014 | Rob |
| 2015/0224759 | A1 | 8/2015 | Boon |
| 2015/0247487 | A1 | 9/2015 | Oerlemans et al. |
| 2015/0308404 | A1 | 10/2015 | Dahl |
| 2015/0316028 | A1 | 11/2015 | Breckenfeld |
| 2015/0322920 | A1* | 11/2015 | Jones ..................... F03D 3/005 416/1 |
| 2016/0023433 | A1 | 1/2016 | Langone |
| 2016/0052173 | A1 | 2/2016 | Hunter |
| 2016/0107397 | A1 | 4/2016 | Schibsbye |
| 2016/0146019 | A1 | 5/2016 | Pizano et al. |
| 2016/0168997 | A1 | 6/2016 | Garm |
| 2016/0263844 | A1 | 9/2016 | Smith |
| 2016/0297145 | A1 | 10/2016 | Wu |
| 2016/0319801 | A1 | 11/2016 | Smith |
| 2016/0327019 | A1 | 11/2016 | Tobin et al. |
| 2016/0327020 | A1 | 11/2016 | Tobin et al. |
| 2016/0327021 | A1 | 11/2016 | Tobin et al. |
| 2016/0354984 | A1 | 12/2016 | Hedges |
| 2016/0377050 | A1 | 12/2016 | Caruso et al. |
| 2016/0377051 | A1 | 12/2016 | Caruso et al. |

(56) References Cited

U.S. PATENT DOCUMENTS

| | | |
|---|---|---|
| 2016/0377052 A1* | 12/2016 | Caruso .................. F03D 1/0675 416/226 |
| 2017/0015066 A1 | 1/2017 | Herrmann |
| 2017/0021575 A1 | 1/2017 | Hansen et al. |
| 2017/0022821 A1 | 1/2017 | Ferber |
| 2017/0030330 A1 | 2/2017 | Caruso |
| 2017/0050372 A1 | 2/2017 | Nielsen et al. |
| 2017/0051718 A1 | 2/2017 | Klitgaard |
| 2017/0057158 A1 | 3/2017 | Caruso et al. |
| 2017/0058862 A1 | 3/2017 | Caruso et al. |
| 2017/0058865 A1 | 3/2017 | Caruso et al. |
| 2017/0058866 A1 | 3/2017 | Caruso |
| 2017/0074236 A1 | 3/2017 | Hynum et al. |
| 2017/0074237 A1 | 3/2017 | Caruso et al. |
| 2017/0074238 A1 | 3/2017 | Tobin et al. |
| 2017/0074240 A1 | 3/2017 | Caruso et al. |
| 2017/0082087 A1 | 3/2017 | Yarbrough et al. |
| 2017/0082088 A1 | 3/2017 | Yarbrough et al. |
| 2017/0100902 A1 | 4/2017 | Asmatulu et al. |
| 2017/0113265 A1 | 4/2017 | Slavens et al. |
| 2017/0122287 A1 | 5/2017 | Dobbe et al. |
| 2017/0145990 A1 | 5/2017 | Drack et al. |
| 2017/0175534 A1 | 6/2017 | Ferber |
| 2017/0204833 A1 | 7/2017 | Albert et al. |
| 2017/0225362 A1 | 8/2017 | Anthony et al. |
| 2017/0252966 A1 | 9/2017 | Susnjara |
| 2017/0306766 A1 | 10/2017 | Munzer |
| 2018/0135602 A1 | 5/2018 | Tobin et al. |
| 2018/0156190 A1 | 6/2018 | Johnson |
| 2018/0216601 A1 | 8/2018 | Yarbrough |
| 2018/0223794 A1 | 8/2018 | Tobin et al. |
| 2018/0223795 A1 | 8/2018 | Tobin et al. |
| 2018/0229452 A1 | 8/2018 | Ogale |
| 2018/0264749 A1 | 9/2018 | Albert |
| 2018/0283349 A1 | 10/2018 | Wardropper |
| 2018/0311927 A1 | 11/2018 | Tyan |
| 2019/0001589 A1 | 1/2019 | Salimi |
| 2019/0032491 A1 | 1/2019 | Nissen et al. |
| 2019/0153994 A1 | 5/2019 | Tobin |
| 2019/0178227 A1 | 6/2019 | Hawkins |
| 2019/0195191 A1 | 6/2019 | Girolamo |
| 2019/0291861 A1 | 9/2019 | McIntyre et al. |
| 2019/0293049 A1 | 9/2019 | Roberts |

FOREIGN PATENT DOCUMENTS

| | | |
|---|---|---|
| CN | 204488065 U | 7/2015 |
| CN | 104955278 A | 9/2015 |
| CN | 107187020 A | 9/2018 |
| EP | 0435466 A2 | 7/1991 |
| EP | 2204577 A2 | 7/2010 |
| EP | 2653717 A1 | 10/2013 |
| EP | 3037655 A1 | 6/2016 |
| EP | 3138697 A1 | 8/2017 |
| ES | 2371893 | 11/2012 |
| JP | H07102609 B2 | 11/1995 |
| JP | 2000 317972 A | 11/2000 |
| JP | 2007/009926 A | 1/2007 |
| JP | 2007/092716 A | 4/2007 |
| JP | 2012 158151 A | 8/2012 |
| JP | 2016 032929 A | 3/2016 |
| KR | 10-2012-0005985 A | 1/2012 |
| KR | 101 520 898 B1 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO2015/015202 A1 | 2/2015 |
| WO | WO2017/092766 A1 | 6/2017 |
| WO | WO2018/015250 A1 | 1/2018 |

OTHER PUBLICATIONS

CGTech VERICUT, Automated Fibre Placement—wind blade: VERICUT Composite CNC simulation, Sep. 16, 2015, YouTube, retrieved from the Internet on Sep. 28, 2019, URL: https://youtu.be/xFNtTE82DiU (Year: 2015).

Thamizhisai Periyaswamy, Karthikeyan Balasubramanian, Christopher Pastore, "Novel characterization method for fibrous materials using non-contact acoustics: Material properties revealed by ultrasonic perturbations", Sep. 16, 2014, Elsevier, Ultrasonics 56, 261-369 (Year: 2014).

Zhai, Yuwei et. al., Additive Manufacturing: Making Imagination the Major Limitation, Journal of Metals, vol. 66, No. 5, Springer, NY, Mar. 11, 2014. pp. 808-816.

Patlolla, New progress in self-healing technology of composite wind turbine blades, Department of Mechanical Engineering, Wichita State Univeristy, https://soar.wichita.edu/handle/10057/5493, Feb. 16, 2012 (Abstract Only).

Matt, Development of Novel Self-Healing Polymer Composites for Use in Wind Turbine Blades http://energyresources.asmedigitalcollection.asme.org/article.aspx?articleid=2174064, The American Society of Mechanical Engineers, Journal of Energy Resources Technology, vol. 137, Issue 5, Sep. 1, 2015 (Abstract Only).

Teuwen et al., Vacuum Infused Thermoplastic Composites for Wind Turbine Blades,2008 Wind Turbine Blade Workshop—Sandia National Laboratories, Jun. 3, 2008, 22 pages.

* cited by examiner

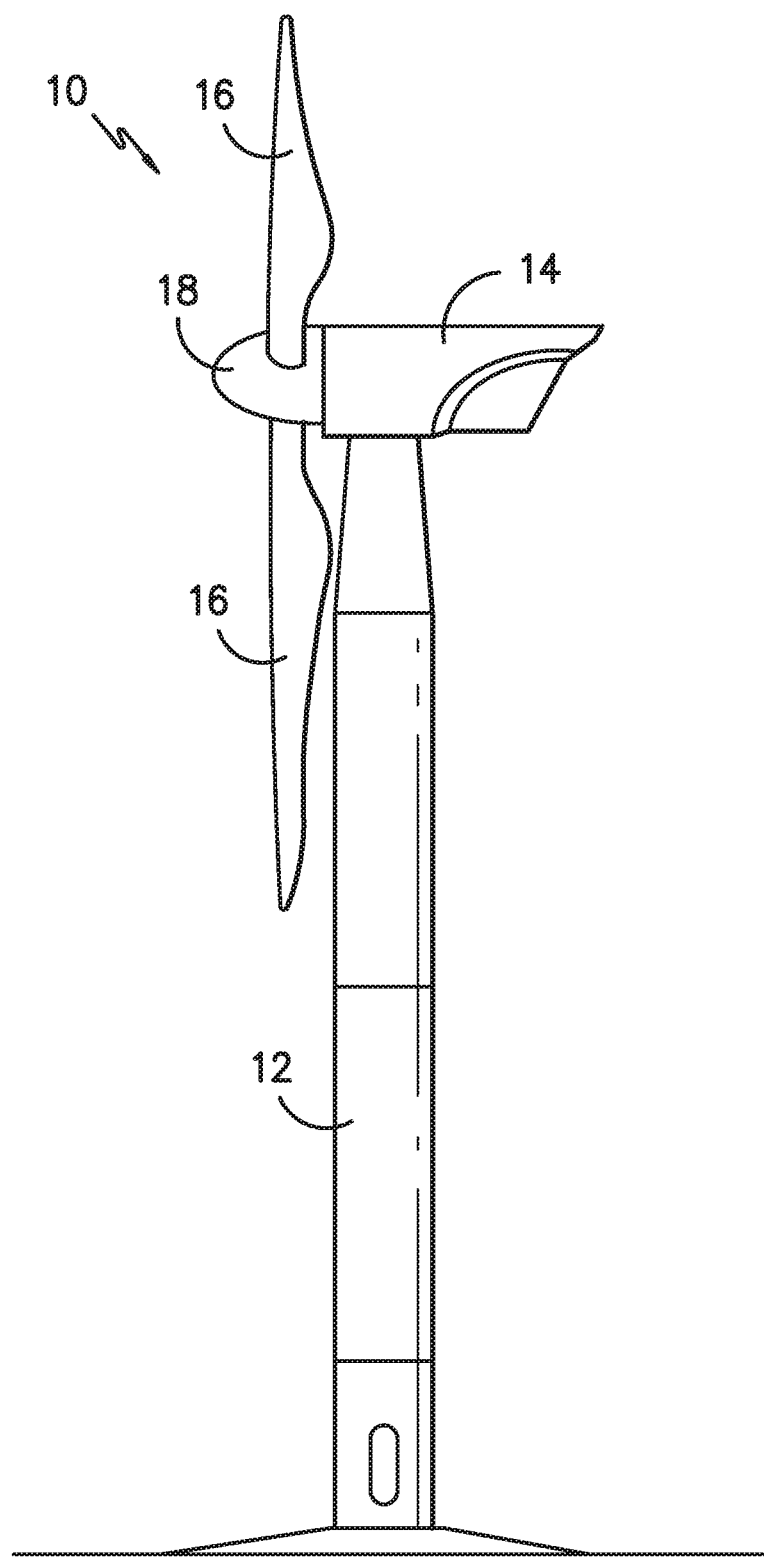
FIG. -1-

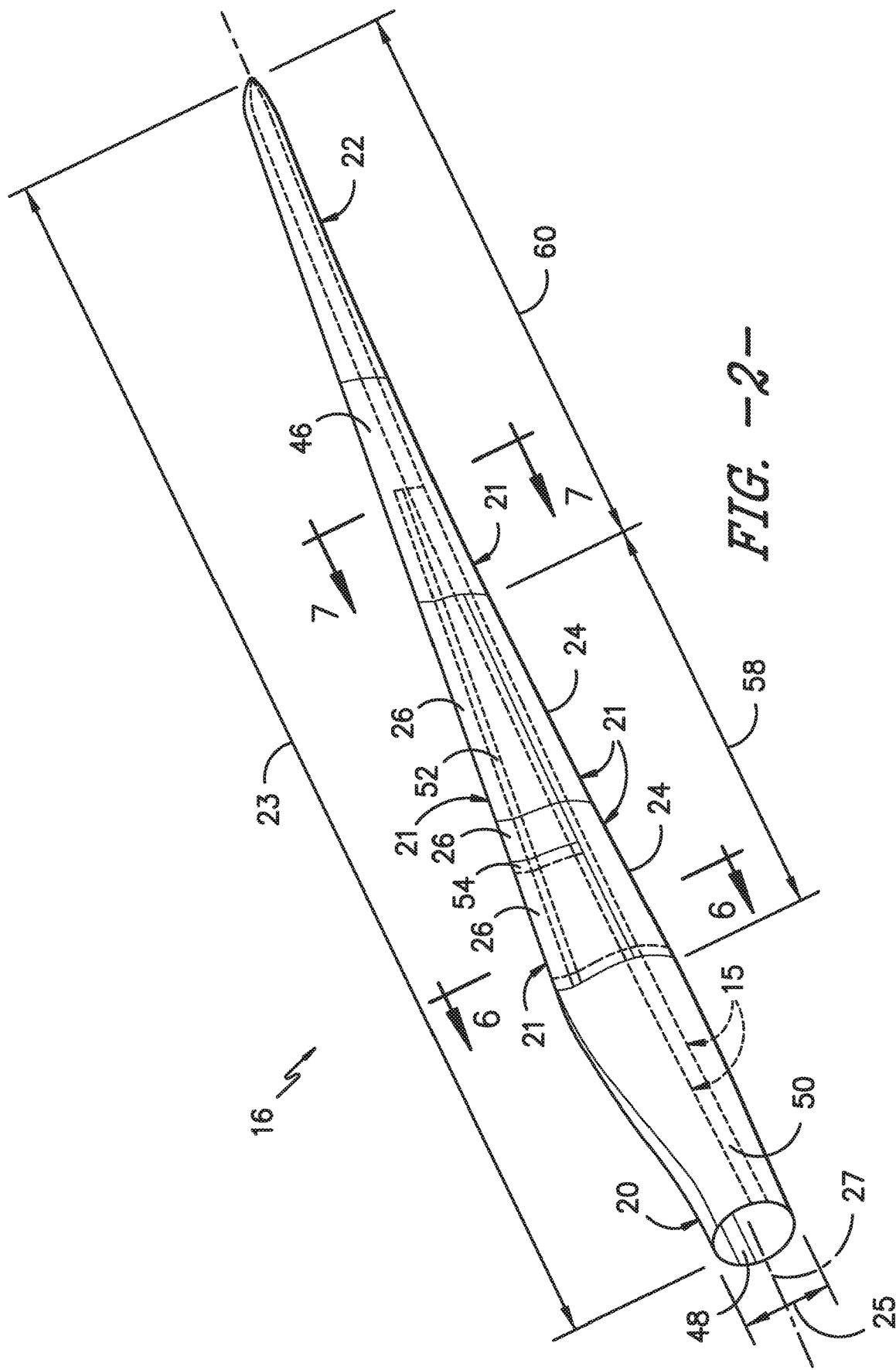
FIG. -2-

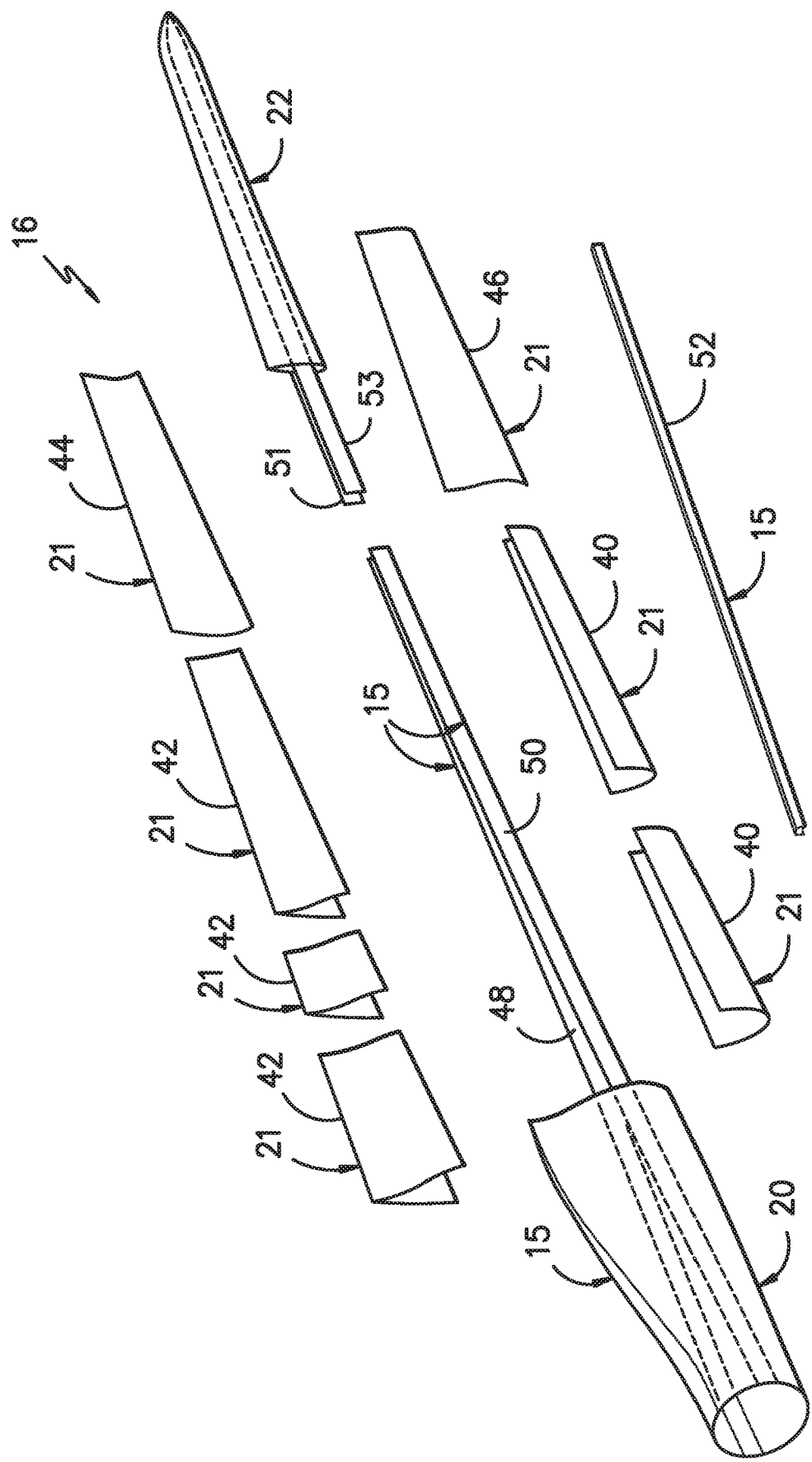
FIG. -3-

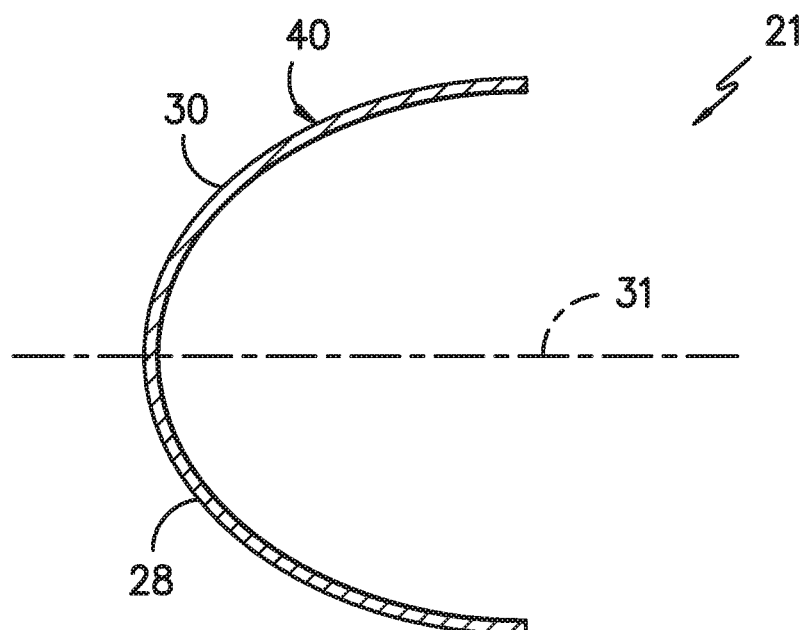
FIG. -4-
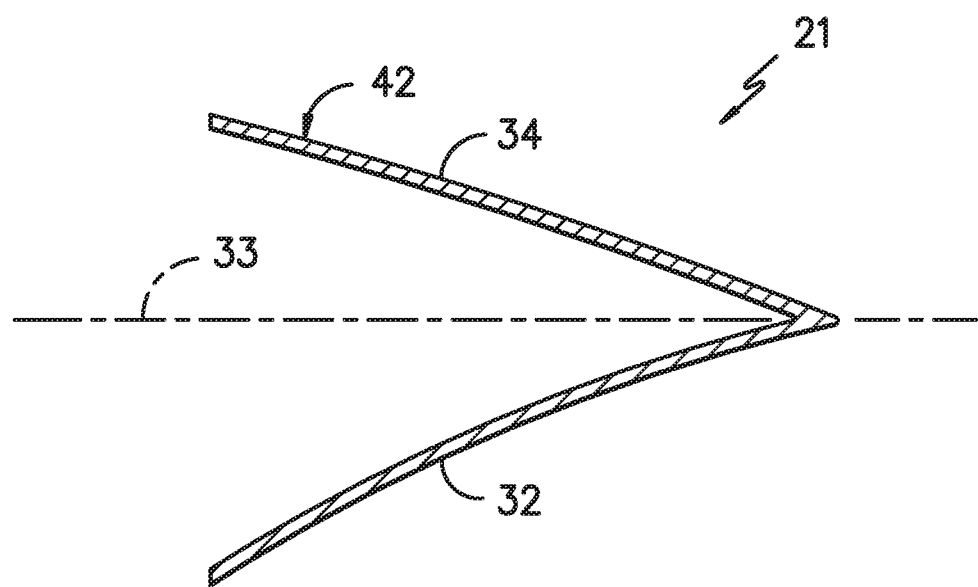
FIG. -5-

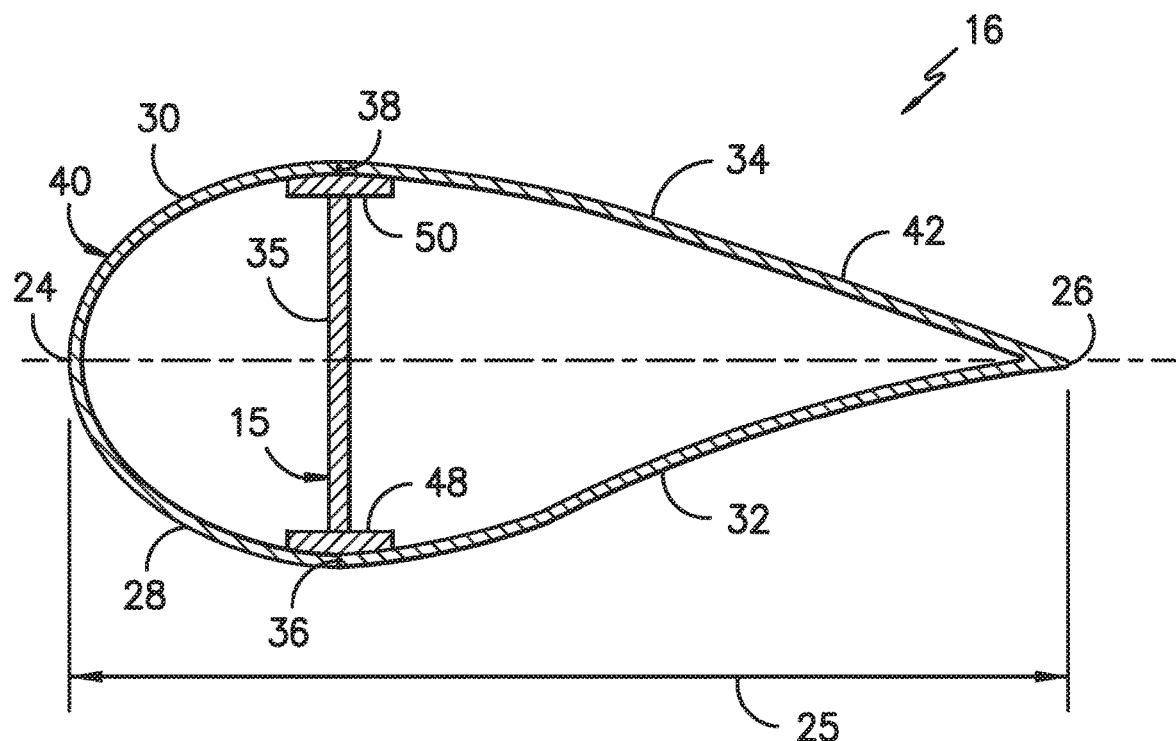
FIG. -6-
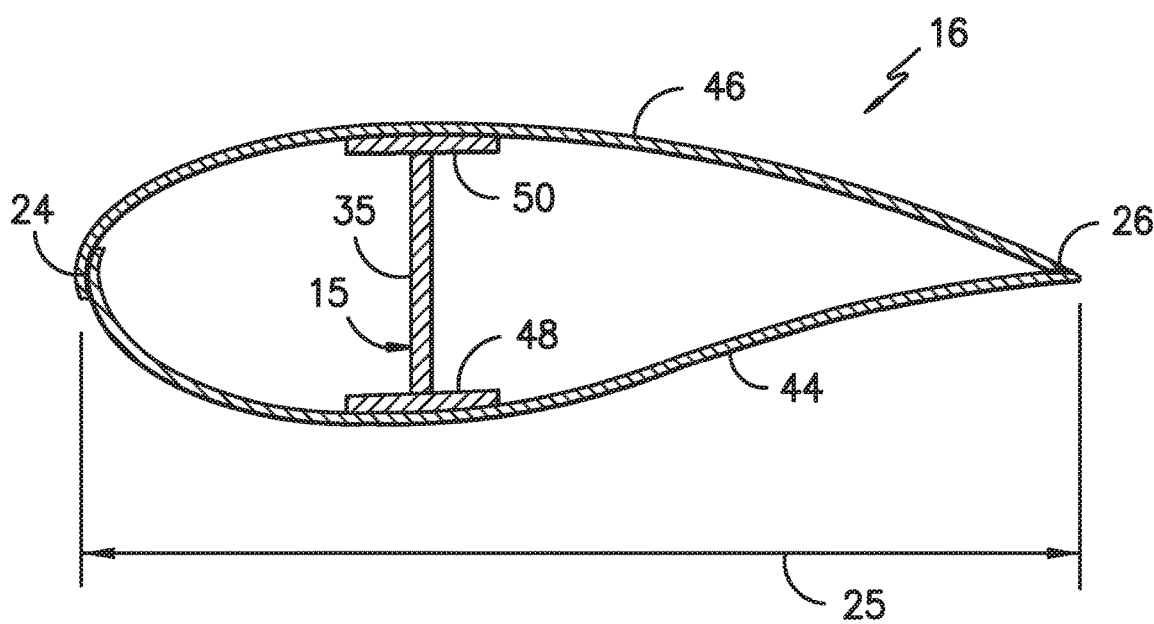
FIG. -7-

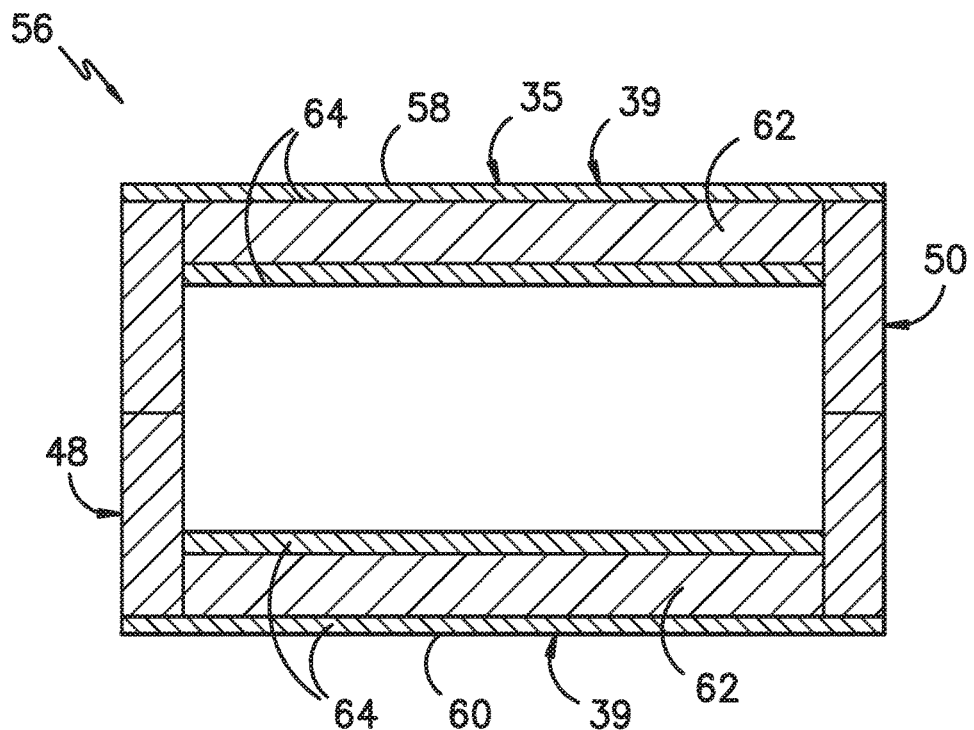
FIG. -8-
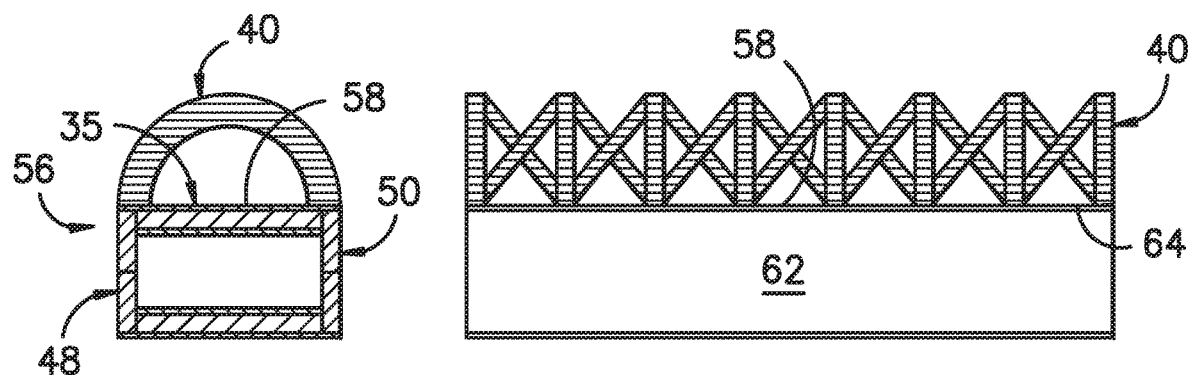
FIG. -9-   FIG. -10-

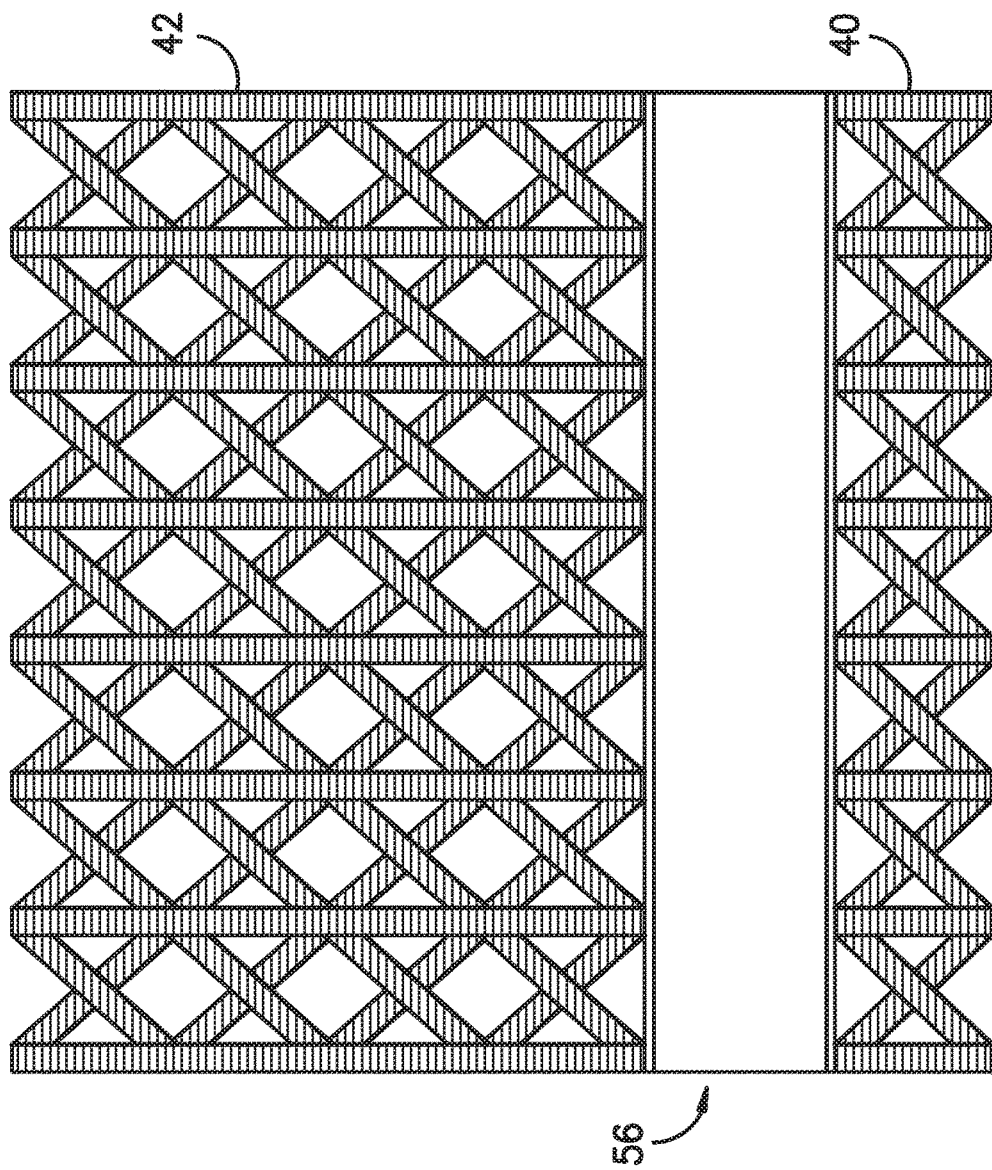
FIG. -12-
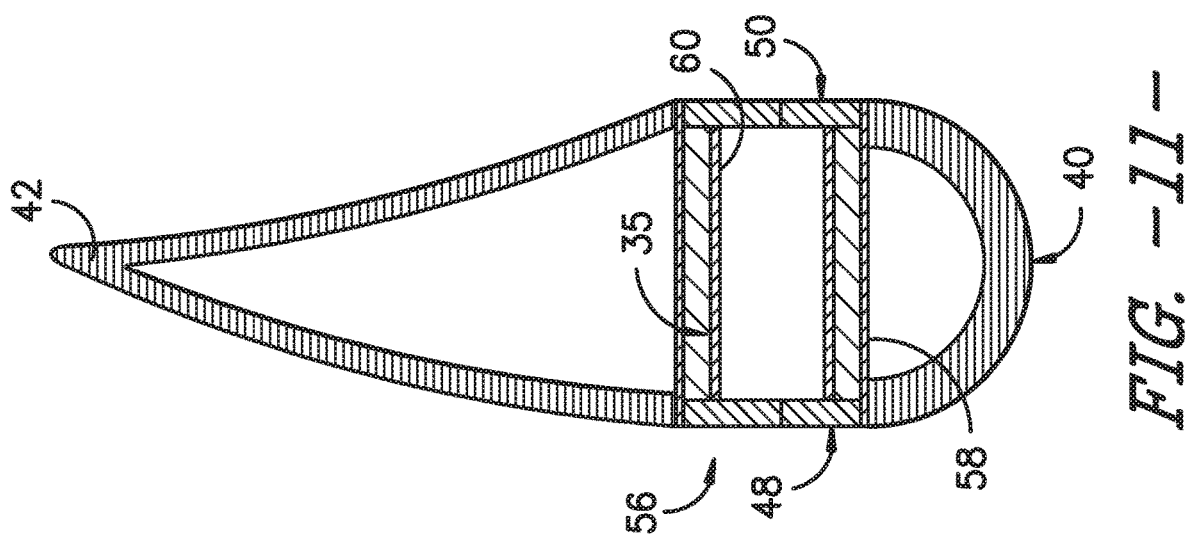
FIG. -11-

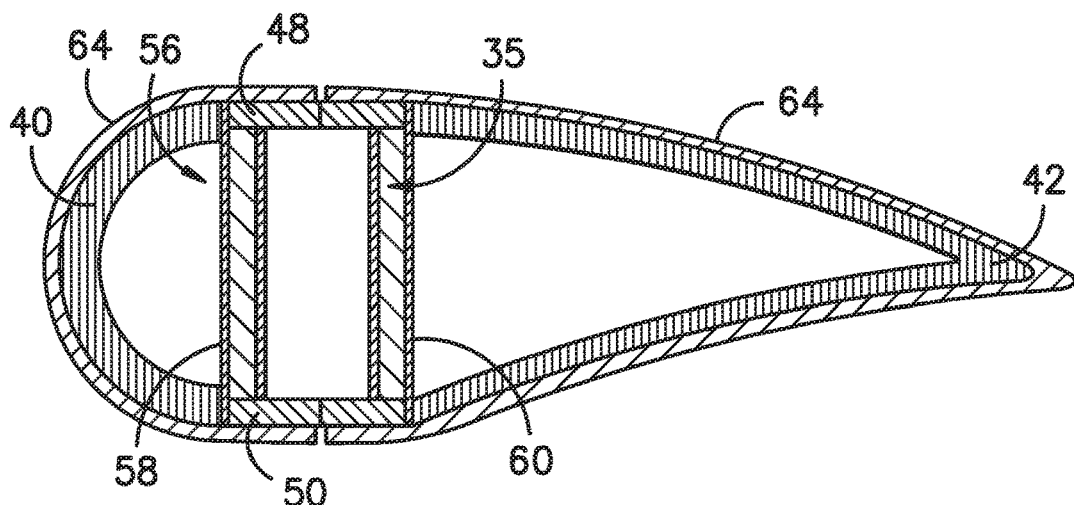
FIG. -13-
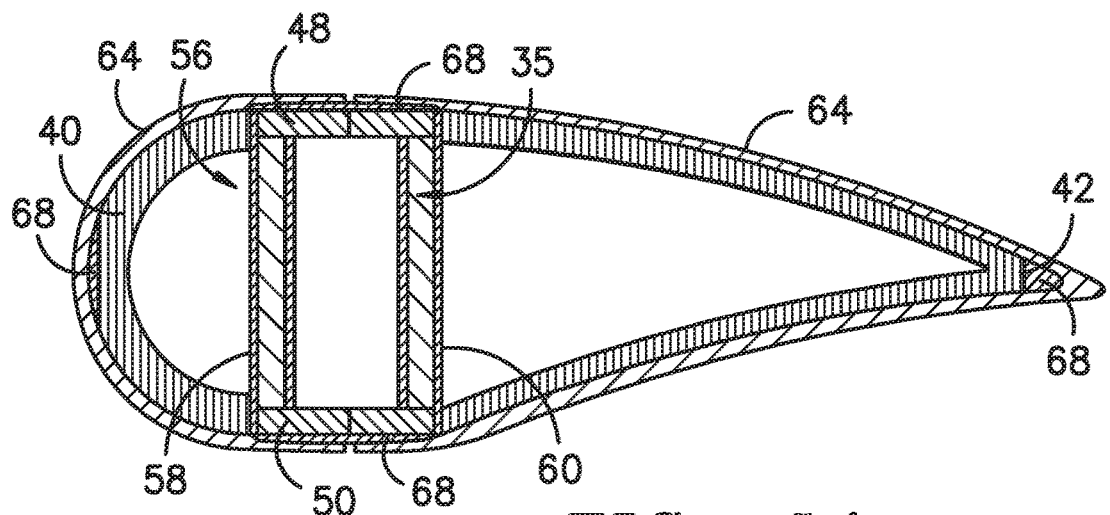
FIG. -14-
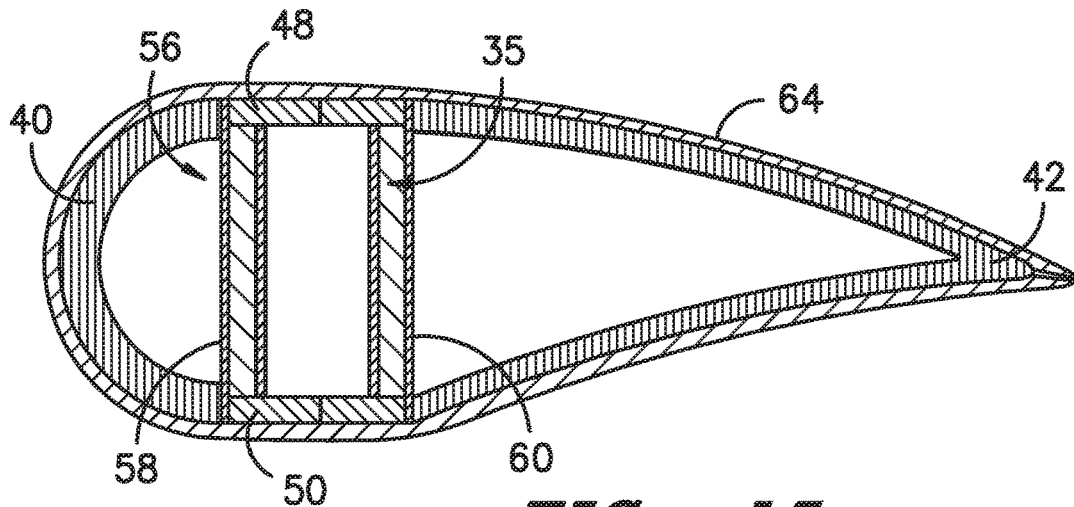
FIG. -15-

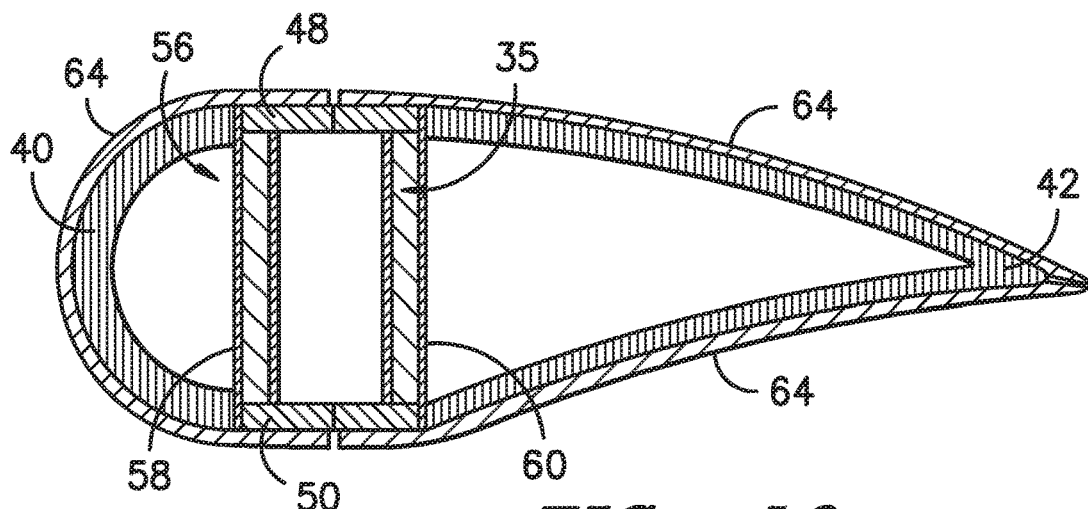
FIG. -16-
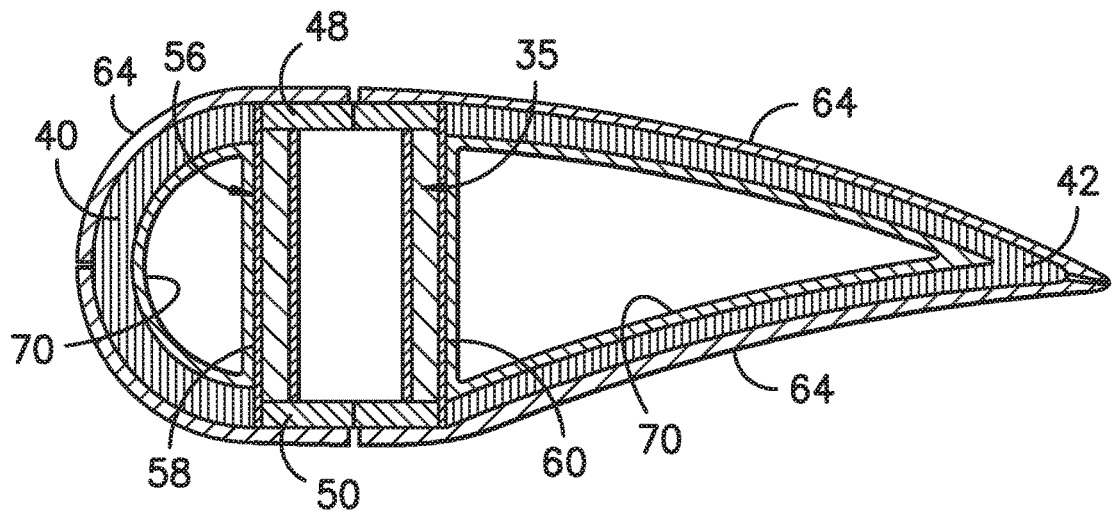
FIG. -17-
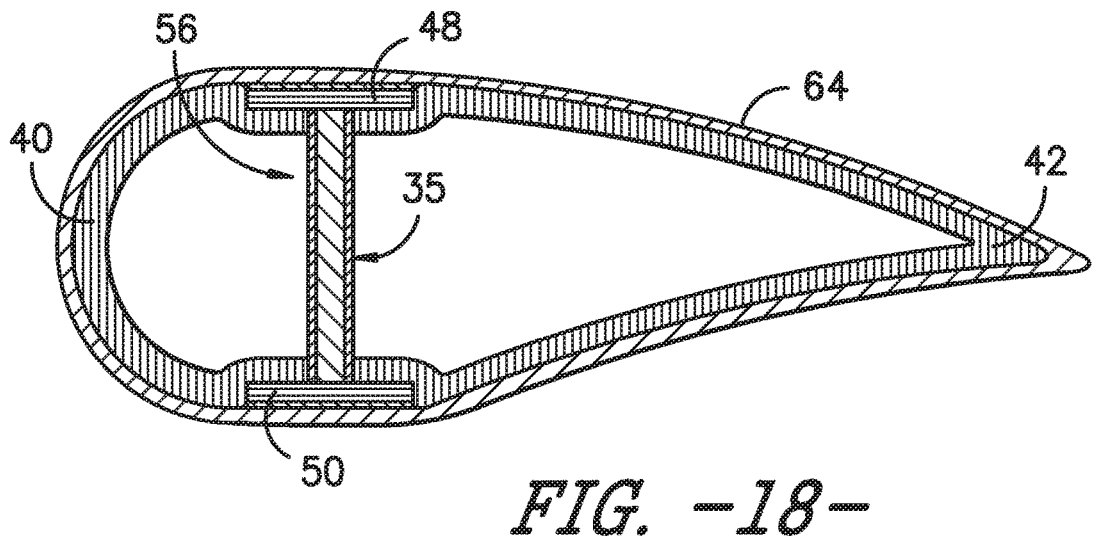
FIG. -18-

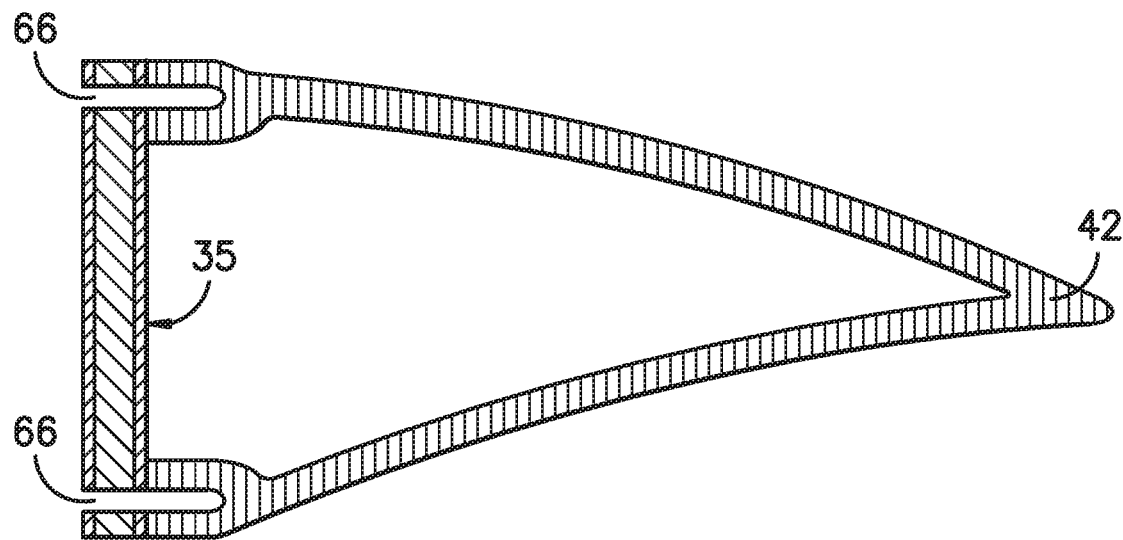
FIG. -19-
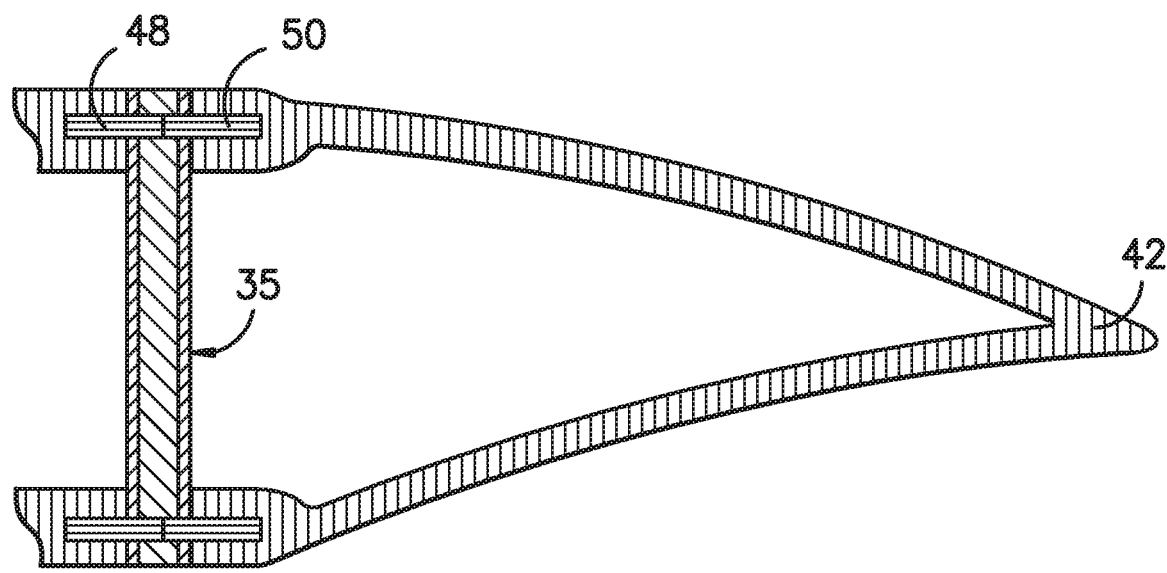
FIG. -20-

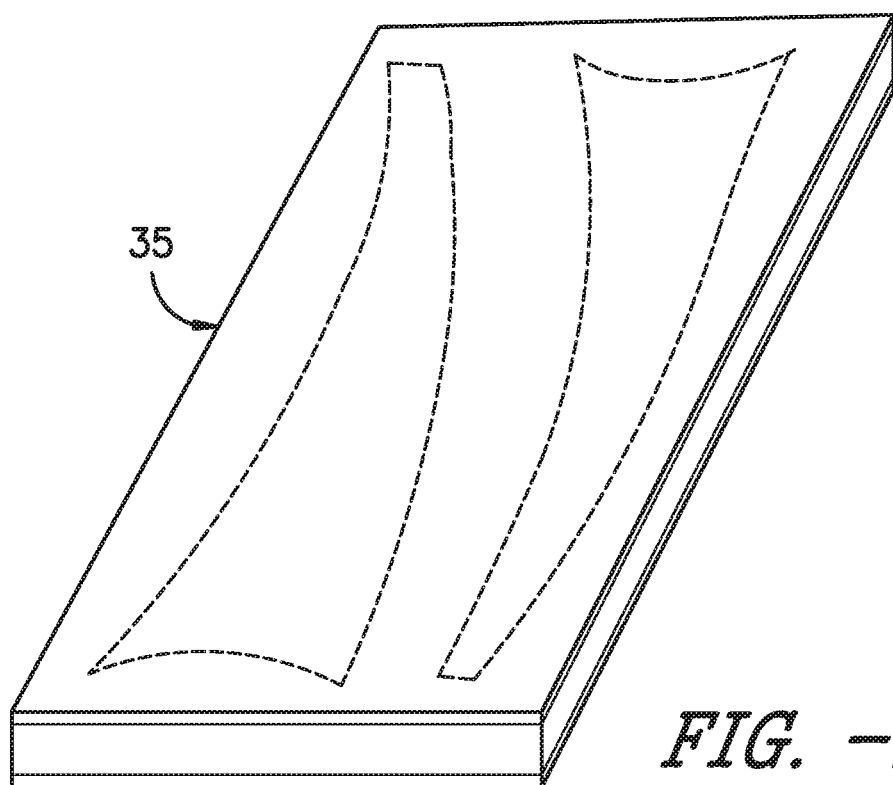
FIG. -21-
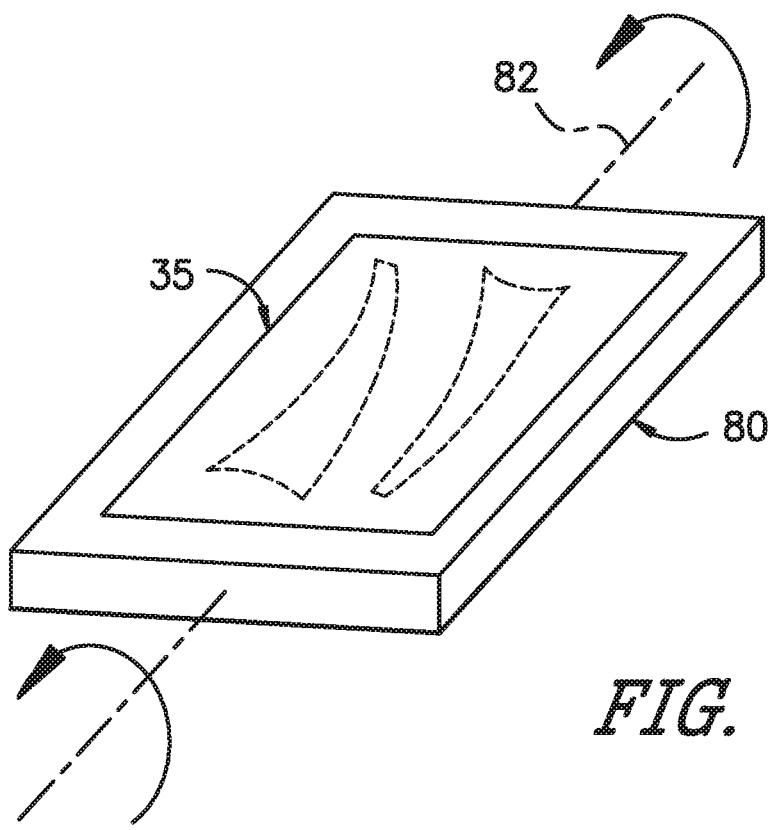
FIG. -22-

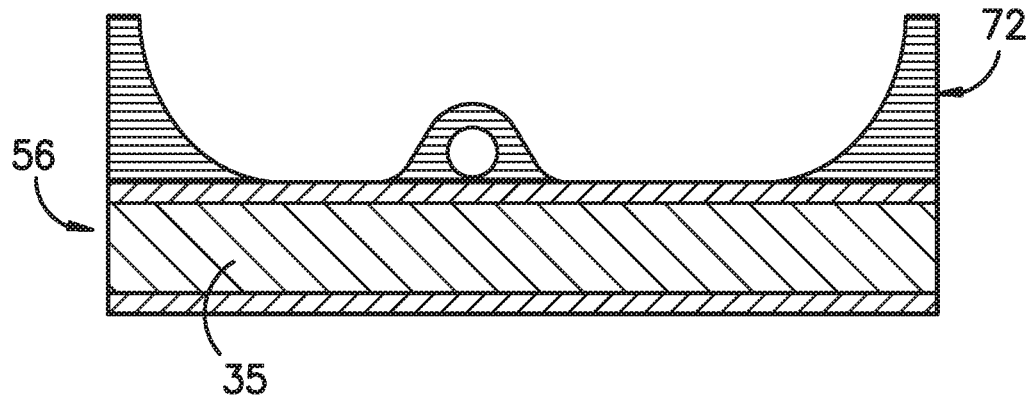
FIG. -23-
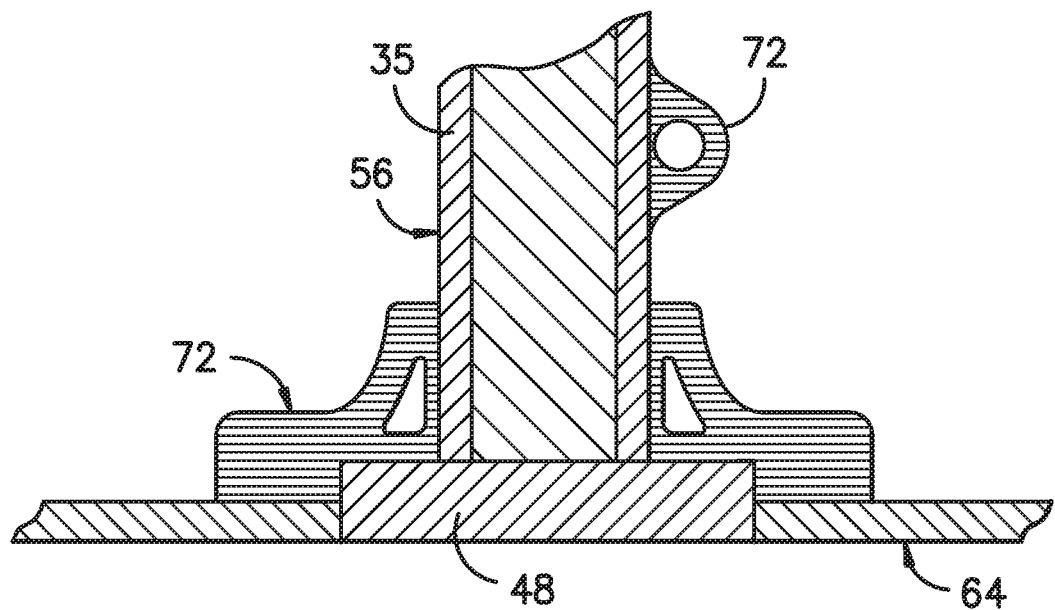
FIG. -24-

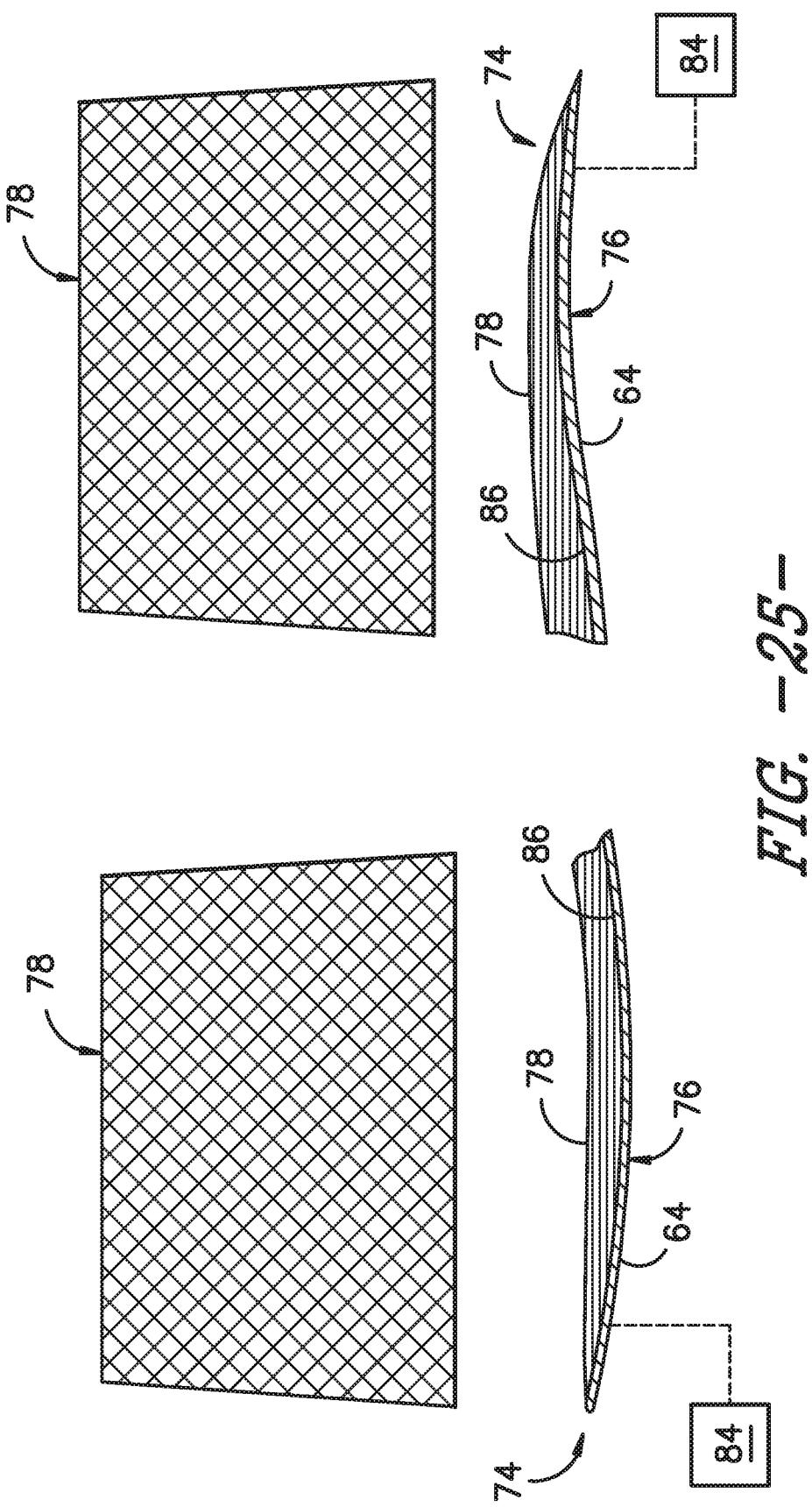
FIG. -25-

METHODS FOR MANUFACTURING WIND TURBINE ROTOR BLADES AND COMPONENTS THEREOF

FIELD OF THE INVENTION

The present disclosure relates in general to wind turbine rotor blades, and more particularly to methods of manufacturing wind turbine rotor blades and components thereof.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Conventional blade manufacturing of large rotor blades involve high labor costs, slow through put, and low utilization of expensive mold tooling. Further, the blade molds can be expensive to customize.

Thus, methods for manufacturing rotor blades may include forming the rotor blades in segments. The blade segments may then be assembled to form the rotor blade. For example, some modern rotor blades, such as those blades described in U.S. patent application Ser. No. 14/753,137 filed Jun. 29, 2015 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component.

Thus, the art is continually seeking methods of manufacturing wind turbine rotor blades and components thereof.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for manufacturing a rotor blade of a wind turbine. The method includes forming a rotor blade structure having a first surface and an opposing, second surface, the first and second surfaces being substantially flat. Another step includes printing, via a computer numeric control (CNC) device, a leading edge segment of the rotor blade onto the first surface, wherein the leading edge segment bonds to the first surface as the leading edge segment is being deposited. Further, the method includes rotating the rotor blade structure having the leading edge segment attached thereto, e.g. until the opposing second surface is facing upward. Thus, the method also includes printing, via the CNC device, a trailing edge segment of the rotor blade onto the second surface, wherein the leading edge segment bonds to the first surface as the leading edge segment is being deposited. In addition, the method includes securing one or more fiber-reinforced outer skins to the printed leading and trailing edge segments so as to complete the rotor blade.

In one embodiment, the rotor blade structure may include at least one of a shear web or one or more spar caps. Further, in certain embodiments, the step of forming the rotor blade structure may include forming the shear web from one or more sandwich panels having a core material surrounded by one or more fiber-reinforced thermoplastic or thermoset skins. In addition, the step of forming the rotor blade structure may include machining, water-jet cutting, or laser-jet cutting a profile of the shear web into the sandwich panel. In particular embodiments, the shear web and the one or more spar caps may include a box configuration.

In another embodiment, the method may further include forming one or more slots in at least one of the rotor blade structure, the leading edge segment, or the trailing edge segment, inserting the one or more spar caps into the one or more slots, and securing the one or more spar caps into the one or more slots via at least one of adhesives, fasteners, or welding.

In further embodiments, the leading and trailing edge segments of the rotor blade may be constructed of a fiber-reinforced thermoplastic or thermoset material.

In additional embodiments, the step of rotating the rotor blade structure having the leading edge segment attached thereto may include utilizing a fourth axis configured in the CNC device that rotates the rotor blade structure.

In another embodiment, the step of securing one or more fiber-reinforced outer skins to the leading and trailing edge segments so as to complete the rotor blade may include at least one of bonding or welding the one or more fiber-reinforced thermoplastic or thermoset outer skins to the leading and trailing edge segments.

In certain embodiments, the fiber-reinforced outer skin(s) may include continuous, multi-axial fibers, such as biaxial fibers. In further embodiments, the fiber-reinforced outer skin(s) may include pressure and suction side skins, a split trailing edge segment skin, leading and trailing edge segment skins, or combinations thereof.

In yet another embodiment, the method may include forming the fiber-reinforced outer skin(s) via at least one of injection molding, three-dimensional (3-D) printing, two-dimensional (2-D) pultrusion, 3-D pultrusion, thermoforming, vacuum forming, pressure forming, bladder forming, automated fiber deposition, automated fiber tape deposition, or vacuum infusion.

In additional embodiments, the method may further include printing, via the CNC device, one or more structural components at one or more locations of the rotor blade containing a gap. In such embodiments, the one or more locations may include at least one of the leading edge segment, the trailing edge segment, or the spar caps of the rotor blade.

In still further embodiments, the method includes securing one or more fiber-reinforced inner skins to the rotor blade structure prior to printing the leading and trailing edge segments.

In another embodiment, the method includes printing, via the CNC device, one or more additional features directly to the rotor blade structure, wherein heat from the printing bonds the additional features to the rotor blade structure. More specifically, in certain embodiments, the additional feature(s) may include a structural shear clip, a lightning cable connection guide, a lightning cable cover, a gusset feature, a landing interface, a trough for the one or more spar caps, or similar.

In another aspect, the present disclosure is directed to a method for manufacturing at least a portion of a rotor blade of a wind turbine. The method includes forming a rotor blade structure having a first surface and an opposing, second surface, the first and second surfaces being substantially flat. Further, the method includes printing, via a CNC device, at least one of a leading edge segment of the rotor blade or a trailing edge segment of the rotor blade onto one of the first or second surfaces, wherein the printed segment bonds to the first or second surface as segment is being deposited. Moreover, the method includes securing the other of the leading edge segment or the trailing edge segment to the opposing first or second surface so as to complete the rotor blade.

In yet another aspect, the present disclosure is directed to a rotor blade of a wind turbine. The rotor blade includes a rotor blade structure having a box configuration with opposing spar caps and parallel shear web members. The parallel shear web members define a first surface and an opposing, second surface, the first and second surfaces being substantially flat. Further, the rotor blade includes a printed leading edge segment bonded to the first surface of the parallel shear web members and a printed trailing edge segment bonded onto the second surface of the parallel shear web members. In addition, the leading and trailing edge segments are constructed of a fiber-reinforced thermoplastic or thermoset material. The rotor blade also includes one or more continuous, multi-axial fiber-reinforced outer skins secured to the printed leading and trailing edge segments.

In one embodiment, the shear web is constructed of one or more sandwich panels having a core material surrounded by one or more fiber-reinforced outer skins. In another embodiment, the spar cap(s) may be constructed of pultruded members. In further embodiments, the fiber-reinforced thermoplastic outer skin(s) may include pressure and suction side skins, a split trailing edge skin, leading and trailing edge segment skins, or combinations thereof. It should also be understood that the rotor blade may further include additional features as described herein.

In yet another aspect, the present disclosure is directed to a method for manufacturing a rotor blade panel of a wind turbine. The method includes forming an outer surface of the rotor blade panel from one or more fiber-reinforced outer skins. The method also includes printing, via a CNC device, at least one 3-D reinforcement structure onto an inner surface of the one or more fiber-reinforced outer skins to form the rotor blade panel. Thus, the reinforcement structure bonds to the one or more fiber-reinforced outer skins as the reinforcement structure is being deposited.

In one embodiment, the fiber-reinforced outer skins or the reinforcement structure may be constructed of a thermoplastic material or a thermoset material. More specifically, the fiber-reinforced outer skins or the reinforcement structure may include a thermoplastic polymer, a thermoset polymer, a thermoplastic foam, or a thermoset foam. In another embodiment, the reinforcement structure may include a fiber material, including but not limited to glass fibers, nanofibers, carbon fibers, metal fibers, wood fibers, bamboo fibers, polymer fibers, or ceramic fibers, or similar.

In further embodiments, the rotor blade panel may include a pressure side surface, a suction side surface, a trailing edge segment, a leading edge segment, or combinations thereof.

In additional embodiments, the CNC device deposits the reinforcement structure along a contour of the inner surface of the one or more fiber reinforced outer skins.

In yet another embodiment, the method includes printing and depositing, via the CNC device, one or more aerodynamic surface features to an outer surface of the one or more fiber reinforced outer skins. More specifically, in such embodiments, the aerodynamic feature(s) may include vortex generators, chord extensions, serrations, gurney flaps, flow anchors, tip extensions, winglets, or similar.

In still further embodiments, the method may also include forming the one or more fiber-reinforced outer skins via at least one of injection molding, 3-D printing, two-dimensional (2-D) pultrusion, 3-D pultrusion, thermoforming, vacuum forming, pressure forming, bladder forming, automated fiber deposition, automated fiber tape deposition, or vacuum infusion.

In another embodiment, the step of forming the outer surface of the rotor blade panel from one or more fiber-reinforced outer skins may include providing one or more generally flat fiber-reinforced outer skins, forcing the one or more fiber-reinforced outer skins into a desired shape corresponding to a contour of the outer surface of the rotor blade, and maintaining the one or more fiber-reinforced outer skins in the desired shape during printing and depositing such that when the one or more fiber-reinforced outer skins with the reinforcement structure printed thereto is released, the outer skins generally retain the desired shape. In certain embodiments, the fiber-reinforced outer skins are forced into and maintained in the desired shape during printing and depositing via a tooling device. More specifically, in particular embodiments, the tooling device may include vacuum, one or more magnets, one or more mechanical devices, one or more adhesives, a heating system, a cooling system, or any combination thereof.

In one embodiment, the method may further include treating the inner surface of the one or more fiber-reinforced outer skins to promote bonding between the one or more fiber-reinforced outer skins and the reinforcement structure. More specifically, in certain embodiments, the step of treating the inner surface may include flame treating, plasma treating, chemical treating, chemical etching, mechanical abrading, embossing, elevating a temperature of at least areas to be printed on the one or more fiber reinforced outer skins, and/or any other suitable treatment method to promote said bonding. In additional embodiments, the method may include forming the one or more fiber-reinforced outer skins with more (or even less) matrix resin material on the inside surface to promote said bonding.

In still further embodiments, the method may include printing, via the CNC device, one or more structural components at one or more locations of the assembled rotor blade containing a gap. More specifically, in certain embodiments, the one or more locations may include a leading edge, a trailing edge, one or more spar caps, or a shear web. For example, in particular embodiments, after the rotor blade has been assembled, one or more gaps may exist between installed components, e.g. the installed spar cap installed or when the rotor blade is closed). In such instances, the structural components are configured to fill the gap.

In yet another embodiment, the method may include securing one or more fiber-reinforced inner skins to the rotor blade panel.

In particular embodiments, the method may also include printing, via the CNC device, one or more additional features directly to the rotor blade panel, wherein heat from the printing bonds the additional features to the rotor blade panel. In such embodiments, the additional feature(s) may include a spar cap, a shear web, a structural shear clip, a lightning cable connection guide, a lightning cable cover, a gusset feature, a landing interface, or a trough for one or more spar caps.

It should also be understood that the method may further include any of the additional steps and/or features as described herein.

In still another aspect, the present disclosure is directed to a rotor blade panel for a rotor blade of a wind turbine. The rotor blade panel includes an outer surface formed from one or more continuous, multi-axial fiber-reinforced thermoplastic or thermoset outer skins and a three-dimensional (3-D) printed reinforcement structure welded onto an inner surface of the one or more fiber-reinforced thermoplastic outer skins. Further, the reinforcement structure is constructed of a fiber-reinforced thermoplastic or thermoset material.

In one embodiment, the outer surface may correspond to a pressure side surface of the rotor blade, a suction side surface of the rotor blade, a trailing edge segment of the rotor blade, a leading edge segment of the rotor blade, or combinations thereof.

It should also be understood that the rotor blade panel may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure along line 6-6;

FIG. 7 illustrates a cross-sectional view of the modular rotor blade of FIG. 2 according to the present disclosure along line 7-7;

FIG. 8 illustrates a cross-sectional view of one embodiment of a rotor blade structure according to the present disclosure, particularly illustrating a rotor blade structure having a box configuration;

FIG. 9 illustrates a cross-sectional view of one embodiment of a rotor blade structure having a leading edge segment of the rotor blade printed thereto according to the present disclosure;

FIG. 10 illustrates a detailed, cross-sectional view of FIG. 9;

FIG. 11 illustrates a cross-sectional view of one embodiment of a rotor blade having leading and trailing edge segments of the rotor blade printed to a rotor blade structure according to the present disclosure;

FIG. 12 illustrates a detailed, cross-sectional view of FIG. 11;

FIG. 13 illustrates a cross-sectional view of another embodiment of a rotor blade according to the present disclosure, particularly illustrating leading and trailing edge outer skins secured to leading and trailing edge segments of the rotor blade;

FIG. 14 illustrates a cross-sectional view of still another embodiment of a rotor blade according to the present disclosure, particularly illustrating a plurality of structural components configured at the leading and trailing edges and the spar caps of the rotor blade;

FIG. 15 illustrates a cross-sectional view of yet another embodiment of a rotor blade according to the present disclosure, particularly illustrating an outer skin with a split trailing edge secured to leading and trailing edge segments of the rotor blade;

FIG. 16 illustrates a cross-sectional view of a further embodiment of a rotor blade according to the present disclosure, particularly illustrating leading and trailing edge outer skins secured to leading and trailing edge segments of the rotor blade, wherein the trailing edge outer skin has a split trailing edge;

FIG. 17 illustrates a cross-sectional view of one embodiment of a rotor blade according to the present disclosure, particularly illustrating inner skins welded to a rotor blade structure of the rotor blade;

FIG. 18 illustrates a cross-sectional view of another embodiment of a rotor blade according to the present disclosure, particularly illustrating a rotor blade structure of the rotor blade having an I-beam configuration;

FIG. 19 illustrates a partial cross-sectional view of one embodiment of a trailing edge segment of a rotor blade according to the present disclosure, particularly illustrating a rotor blade structure having an I-beam configuration with slots configured to receive spar caps therein;

FIG. 20 illustrates a partial cross-sectional view of another embodiment of a trailing edge segment of a rotor blade according to the present disclosure, particularly illustrating a rotor blade structure having an I-beam configuration and having spar caps configured within slots of the rotor blade structure;

FIG. 21 illustrates a perspective view of one embodiment of a shear web that has been printed onto a sandwich panel according to the present disclosure;

FIG. 22 illustrates a perspective view of one embodiment of a shear web configured on a fourth axis of a CNC device, such as a 3-D printer, according to the present disclosure;

FIG. 23 illustrates a cross-sectional view of one embodiment of a shear web that has been printed onto a sandwich panel according to the present disclosure, particularly illustrating additional features that have been printed to the shear web;

FIG. 24 illustrates a perspective view of another embodiment of a shear web that has been printed onto a sandwich panel according to the present disclosure, particularly illustrating additional features that have been printed to the shear web; and FIG. 25 illustrates a schematic diagram of one embodiment of a printed rotor blade panel according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing wind turbine rotor blades and components thereof using automated deposition of materials via technologies such as 3-D Printing, additive manufacturing, automated fiber deposition, as well as other techniques that utilize CNC control and multiple degrees of freedom to deposit material. Thus, the methods described herein provide many advantages not present in the prior art. For example, the methods of the present disclosure provide the ability to easily customize blade structures having various curvatures, aerodynamic characteristics, strengths, stiffness, etc. As such, the printed structures of the present disclosure can be designed to match the stiffness and/or buckling resistance of existing sandwich panels rotor blades. More specifically, the printed structures typically contain hollow structures, which allow the printed structures to be less limited in height because the structures are not completely filled with foam and infusion resin, which is typical for conventional sandwich panels. As such, the rotor blades and components thereof of the present disclosure can be more easily customized based on the local buckling resistance needed. For example, if there is an area of high buckling in the structural analysis, the rib and/or stringer structure of the rotor blade can be printed in a tighter pattern or taller pattern or both to alleviate the area of concern, while using a more open or shorter structure in areas of reduced buckling issues. Further, if desirable, the structure can be built to connect or abut against a structure on the opposite side of the rotor blade in select areas. As such, the methods of the present disclosure are also useful for intentionally allowing less buckling resistance in the rotor blades in select areas to allow buckling during extreme gust events to promote load shedding.

In addition, the methods of the present disclosure provide a high level of automation, faster throughput, and reduced tooling costs and/or higher tooling utilization. Further, the rotor blades of the present disclosure may not require adhesives, especially those produced with thermoplastic materials, thereby eliminating cost, quality issues, and extra weight associated with bond paste.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Referring particularly to FIGS. 2-7, any number of blade segments 21 having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, in certain embodiments, the blade segments 21 may include any one of or combination of the following blade segments: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Thus, where the blade segments 21 are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Referring now to FIGS. 8-25, the present disclosure is directed to methods for manufacturing a rotor blade of a wind turbine, such as the rotor blade 16 illustrated in FIGS. 2 and 3 via 3-D printing. 3-D printing, as used herein, is generally understood to encompass processes used to synthesize three-dimensional objects in which successive layers of material are formed under computer control to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes.

Referring particularly to FIG. 8, one embodiment of the method includes forming a rotor blade structure 56 having a first surface 58 and an opposing, second surface 60. Further, as shown, the first and second surfaces 58, 60 are substantially flat. For example, as shown, the rotor blade structure 56 may include a shear web 35 or one or more spar caps 48, 50, 51, 53. More specifically, as shown in the illustrated embodiment, the shear web 35 may include parallel shear web members 39. Further, in certain embodiments, each of the parallel shear web members 39 may be formed from one or more sandwich panels having a core material 62 surrounded by one or more fiber-reinforced thermoplastic or thermoset outer skins 64. In certain embodiments, the sandwich panels may be pultruded. Further, in particular embodiments, the core material 62 described herein may be constructed of any suitable materials, including but not limited to low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), polyethylene terephthalate (PET) foams, other foam rubbers/resin-based foams and various other open cell and closed cell foams.

In addition, as shown in FIGS. 8-17, the shear web 35 and the one or more spar caps 48, 50, 51, 53 may define a box configuration, i.e. having a square or rectangular cross-section. Thus, as shown, the box configuration define the first and second surfaces 58, 60 that provide ideal printing surfaces for three-dimensionally printing the leading and trailing edge segments 40, 42 of the rotor blade 16, which is discussed in more detail below.

In alternative embodiments, as shown in FIGS. 21 and 22, the step of forming the rotor blade structure 56 may include machining, e.g. via CNC machining, water-jet cutting, or laser-jet cutting a profile of the shear web 35 into the sandwich panel. In such embodiments, as shown in FIGS. 18-20, rather than the rotor blade structure 56 having a box configuration, the structure 56 may have an I-beam configuration with a single shear web 35 and two opposing spar caps 48, 50 as mentioned above. Thus, as shown in FIGS. 19 and 20, the method may further include forming one or more slots 66 in the rotor blade structure 56, the leading edge segments 40, and/or the trailing edge segment 42 of the rotor blade 16. Each of the spar caps 48, 50 can then be easily inserted into one of the slots 66 and secured therein. For example, in certain embodiments, the spar caps 48, 50 may be secured into the slots 66 via at least one of adhesives, fasteners, or welding.

Referring now to FIGS. 9 and 10, the method further includes printing, via a CNC device, a leading edge segment 40 of the rotor blade 16 onto the first surface 58, wherein the leading edge segment 40 bonds to the first surface 58 as the leading edge segment 40 is being deposited. It should be understood that the leading edge segment 40 may have any suitable configuration. For example, as shown, the leading edge segment 40 of the rotor blade 16 may constructed of a plurality of ribs and/or stringers. Further, the leading edge segment 40 may be constructed of a thermoplastic or thermoset fiber-reinforced resin, such as PETG or epoxy and may include short, long and/or continuous fiber materials, such as glass fibers or any suitable fibers described herein. In additional embodiments, structural reinforcements may be added to the leading edge segment 40 during the printing process.

Referring now to FIGS. 11 and 12, the method may also include rotating the rotor blade structure 56 having the leading edge segment 40 attached thereto. More specifically, in certain embodiments, the step of rotating the rotor blade structure 56 having the leading edge segment 40 attached thereto may include utilizing a fourth axis 82 (FIG. 22) configured in the CNC device 80 that rotates the rotor blade structure 56 after the leading edge segment 40 has been printed on the first surface 58. As such, the method may also include printing, via the CNC device 80, a trailing edge segment 42 of the rotor blade 16 onto the second surface 60, wherein the trailing edge segment 42 bonds to the second surface 60 as the trailing edge segment 42 is being deposited. The trailing edge segment 42 of the rotor blade 16 may also be constructed of any suitable thermoplastic or thermoset fiber-reinforced resin.

Referring now to FIGS. 13-18, the method also includes securing one or more fiber-reinforced thermoplastic or thermoset outer skins 64 to the printed leading and trailing edge segments 40, 42 so as to complete the rotor blade 16. More specifically, in certain embodiments, the step of securing the fiber-reinforced outer skin(s) 64 to the leading and trailing edge segments 40, 42 so as to complete the rotor blade 16 may include bonding or welding the fiber-reinforced outer skin(s) 64 to the leading and trailing edges 40, 42. In further embodiments, the outer skin(s) 64 may include pressure and suction side skins, a split trailing edge skin, leading and trailing edge skins, or combinations thereof. For example, as shown in FIG. 13, the outer skin(s) 64 may include a leading edge outer skin and a trailing edge outer skin. As shown in FIG. 14, the outer skin(s) 64 include two leading edge outer skins and a single trailing edge outer skin. As shown in FIG. 15, the outer skin(s) 64 include a single outer skin having a split trailing edge. As shown in FIG. 16, the outer skin(s) 64 include a single leading edge outer skin and two trailing edge outer skins. As shown in FIG. 17, the outer skin(s) 64 include two trailing edge outer skins and two leading edge outer skins.

In addition, in certain embodiments, the outer skin(s) 64 may include continuous multi-axial fibers, such as biaxial fibers. Further, in particular embodiments, the method may include forming the outer skin(s) 64 via at least one of injection molding, 3-D printing, 2-D pultrusion, 3-D pultrusion, thermoforming, vacuum forming, pressure forming, bladder forming, automated fiber deposition, automated fiber tape deposition, or vacuum infusion.

Referring particularly to FIG. 14, the method may further include printing, via the CNC device, one or more structural components 68 (e.g. continuous, unidirectional fibers) at one or more locations of the rotor blade 16 containing a gap, e.g. between the printed leading and trailing edge segments 40, 42 and the outer skin(s) 64. More specifically, as shown, the location(s) may include the leading edge segment 40, the trailing edge segment 42, or the spar caps 48, 50 of the rotor blade 16. In such embodiments, the unidirectional fibers do not run parallel to the build plane due to blade pre-bend, twist, etc.

Referring to FIG. 17, the method may also include securing one or more fiber-reinforced thermoplastic or thermoset inner skins 70 to the rotor blade structure 56. For example, as shown, the inner skins 70 may be welded to the rotor blade structure 56. As such, the inner skins 70 are configured to provide additional structural support to the rotor blade 16.

Referring now to FIGS. 23 and 24, the method may also include printing, via the CNC device, one or more additional features 72 directly to the rotor blade structure 56 and/or to an outer surface of the outer skins 64, wherein heat from the printing bonds the additional features 72 to the rotor blade structure 56. More specifically, as shown, the additional feature(s) 72 may be printed to the rotor blade structure 56 and may include a structural shear clip, a lightning cable connection guide, a lightning cable cover, a gusset feature, a landing interface, a trough for the one or more spar caps, or similar. In additional embodiments, the additional feature(s) 72 may be printed to the outer surface of the outer skins 64 and may include vortex generators, chord extensions, serrations, gurney flaps, flow anchors, tip extensions, winglets, or similar. As such, the methods of the present disclosure can easily print/deposit rotor blade features within the rotor blade or on an exterior of the rotor blade using the same printing techniques.

Referring now to FIG. 25, the present disclosure is also directed to a method for manufacturing a rotor blade panel 74 of a wind turbine, e.g. such as the blade segments illustrated in FIGS. 2-7. As such, in certain embodiments, the rotor blade panel 74 (i.e. the outer surface 76 thereof) may include a pressure side surface, a suction side surface, a trailing edge segment, a leading edge segment, or combinations thereof. More specifically, as shown in FIG. 25, the method includes forming an outer surface 76 of the rotor blade panel 74 from one or more of the fiber-reinforced outer skins 64 described herein. Further, as mentioned, the fiber-reinforced outer skins 64 may include one or more continuous, multi-axial (e.g. biaxial) fiber-reinforced thermoplastic or thermoset outer skins. In addition, as shown, the outer surface 76 of the rotor blade panel 74 may be curved. As such, the CNC device may be adapted to include a tooling path that follows a contour of the curved outer surface 76 of the rotor blade panel 74. As such, the CNC device is configured to print and deposit 3-D reinforcement structure 78 onto an outer surface of the one or more fiber-reinforced outer skins to form the rotor blade panel 74. Thus, the reinforcement structure bonds to the one or more fiber-reinforced outer skins as the reinforcement structure is being deposited. As such, suitable materials for the printed reinforcement 78 and the outer skins 64 are chosen such that the printed reinforcement 78 bonds to the outer skins 64 during deposition.

More specifically, in certain embodiments, the step of forming the outer surface 76 of the rotor blade panel 74 from one or more fiber-reinforced outer skins 64 may include providing one or more generally flat fiber-reinforced outer skins, forcing the outer skins 64 into a desired shape corresponding to a contour of the outer surface 76 of the rotor blade 16, and maintaining the outer skins 64 in the desired shape during printing and depositing. As such, the outer skins 64 generally retain their desired shape when the outer skins 64 and the reinforcement structure printed thereto are released.

In certain embodiments, the outer skins 64 may be forced into and maintained in the desired shape during printing and depositing via a tooling device 84. For example, in particular embodiments, the tooling device 84 may include vacuum, one or more magnets, one or more mechanical devices, one or more adhesives, a heating system, a cooling system, or any combination thereof.

In another embodiment, the method may further include treating the inner surface 86 of the outer skins 64 to promote bonding between the outer skins 64 and the reinforcement structure 78. More specifically, in certain embodiments, the step of treating the inner surface 76 may include flame treating, plasma treating, chemical treating, chemical etching, mechanical abrading, embossing, elevating a temperature of at least areas to be printed on the outer skins 64, and/or any other suitable treatment method to promote said bonding. In additional embodiments, the method may include forming the outer skins 64 with more (or even less) matrix resin material on the inside surface to promote said bonding.

In additional embodiments, the method may include varying the outer skin thickness and/or fiber content, as well as the fiber orientation. Further, the method may include varying the design of the printed ribs and/or stringer structures (e.g. width, height, etc.). For example, in one embodiment, the method may include printing taller reinforcement structures for the pressure side that bond (or abut against) taller structures of the suction side to create additional auxiliary type shear webs/spars depending on the design need.

In additional embodiments, the method may also include printing one or more features at the trailing and/or leading edges of the rotor blade panels that are configured to overlap, e.g. such as interlocking edges or snap fits. Further, the method may include printing the rotor blade panels to include features configured to align the spar caps therein.

The present disclosure is further directed to a method for manufacturing at least a portion of a rotor blade of a wind turbine, such as the rotor blade 16 of FIG. 2. In such an embodiment, the method includes forming a rotor blade structure 56 having a first surface 58 and an opposing, second surface 60, with the first and second surfaces being substantially flat as shown in FIG. 8. Further, the method includes printing, via a CNC device, a leading edge segment 40 of the rotor blade 16 or a trailing edge segment 42 of the rotor blade 16 onto one of the first or second surfaces 58, 60, wherein the printed segment bonds to the first or second surface as segment is being deposited. Moreover, the method also includes securing the other of the leading edge segment 40 or the trailing edge segment 42 to the rotor blade structure 56.

For example, in one embodiment, the leading edge segment 40 may be printed onto the first surface 58. The trailing edge segment 42 may then be formed using the method described with respect to FIG. 25 (i.e. forming an outer surface 76 of the rotor blade panel 74 from one or more of the fiber-reinforced outer skins 64 and then printing and depositing a 3-D reinforcement structure 78 onto an outer surface of the one or more fiber-reinforced outer skins to form the rotor blade panel corresponding to the trailing edge segment 42). As such, the trailing edge segment 42 may then be easily secured to the rotor blade structure 56, e.g. using welding, fasteners, or any other suitable joining method. In still further embodiments, the method may be reversed, where the trailing edge segment 42 is first printed onto a flat surface of the rotor blade structure 56 and the leading edge segment 40 is formed using the method described with respect to FIG. 25 and then secured to the rotor blade structure 56. In other words, any of the embodiments described herein may be combined to construct a rotor blade and its various components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade of a wind turbine, the method comprising:
   forming a rotor blade structure having a box-shaped configuration with a first surface and an opposing, second surface separated by a hollow interior, the first and second surfaces being substantially flat;
   printing, via a computer numeric control (CNC) device, a leading edge segment of the rotor blade onto the first surface, wherein the leading edge segment bonds to the first surface as the leading edge segment is being printed;
   rotating the rotor blade structure having the leading edge segment bonded thereto about an axis of the CNC device such that the second surface is facing upward;
   printing, via the CNC device, a trailing edge segment of the rotor blade onto the second surface, wherein the trailing edge segment bonds to the second surface as the trailing edge segment is being printed; and,
   securing one or more fiber-reinforced outer skins to the leading and trailing edge segments so as to complete the rotor blade.

2. The method of claim 1, wherein the box-shaped configuration of the rotor blade structure comprises at least one of a shear web or one or more spar caps.

3. The method of claim 2, wherein forming the rotor blade structure further comprises forming the shear web from one or more sandwich panels having a core material surrounded by one or more fiber-reinforced thermoplastic or thermoset skins.

4. The method of claim 3, wherein forming the rotor blade structure further comprises machining, water-jet cutting, or laser-jet cutting a profile of the shear web into the sandwich panel.

5. The method of claim 2, further comprising:
   forming one or more slots in at least one of the rotor blade structure, the leading edge segment, or the trailing edge segment;
   inserting the one or more spar caps into the one or more slots; and,
   securing the one or more spar caps into the one or more slots via at least one of adhesives, fasteners, or welding.

6. The method of claim 1, wherein the leading edge segment and the trailing edge segment of the rotor blade are constructed of a fiber-reinforced thermoplastic or thermoset material.

7. The method of claim 1, wherein securing one or more fiber-reinforced outer skins to the leading and trailing edge segments so as to complete the rotor blade further comprises at least one of bonding or welding the one or more fiber-reinforced outer skins to the leading and trailing edge segments.

8. The method of claim 1, wherein the fiber-reinforced outer skins comprise continuous, multi-axial fibers.

9. The method of claim 1, wherein the one or more fiber-reinforced outer skins comprises at least one of pressure and suction side skins, a split trailing edge segment skin, leading and trailing edge segment skins, or combinations thereof.

10. The method of claim 1, further comprising forming the one or more fiber-reinforced outer skins via at least one of injection molding, 3D printing, two-dimensional (2D) pultrusion, 3D pultrusion, thermoforming, vacuum forming, pressure forming, bladder forming, automated fiber deposition, automated fiber tape deposition, or vacuum infusion.

11. The method of claim 1, further comprising printing, via the CNC device, one or more structural components at one or more locations of the rotor blade containing a gap, the one or more locations comprising at least one of the leading edge segment, the trailing edge segment, or the spar caps of the rotor blade.

12. The method of claim 1, further comprising securing one or more fiber-reinforced inner skins to the rotor blade structure.

13. The method of claim 2, further comprising printing, via the CNC device, one or more additional features directly to the rotor blade structure, wherein heat from the printing bonds the additional features to the rotor blade structure, wherein the one or more additional features comprise at least one of a structural shear clip, a lightning cable connection guide, a lightning cable cover, a gusset feature, a landing interface, or a trough for the one or more spar caps.

14. A method for manufacturing at least a portion of a rotor blade of a wind turbine, the method comprising:
   forming a rotor blade structure having a first surface and an opposing, second surface, the first and second surfaces being substantially flat;
   printing, via a computer numeric control (CNC) device, at least one of a leading edge segment of the rotor blade or a trailing edge segment of the rotor blade onto one of the first or second surfaces, wherein the printed segment bonds to the first or second surface as segment is being printed;

rotating the rotor blade structure having the printed segment bonded thereto about an axis of the CNC device such that the other of the leading edge segment or the trailing edge segment is facing upward; and, securing the other of the leading edge segment or the trailing edge segment to the rotor blade structure.

* * * * *